Feb. 12, 1924.
C. J. DE COSTER
1,483,285
LIQUID STRAINER
Filed May 25, 1921
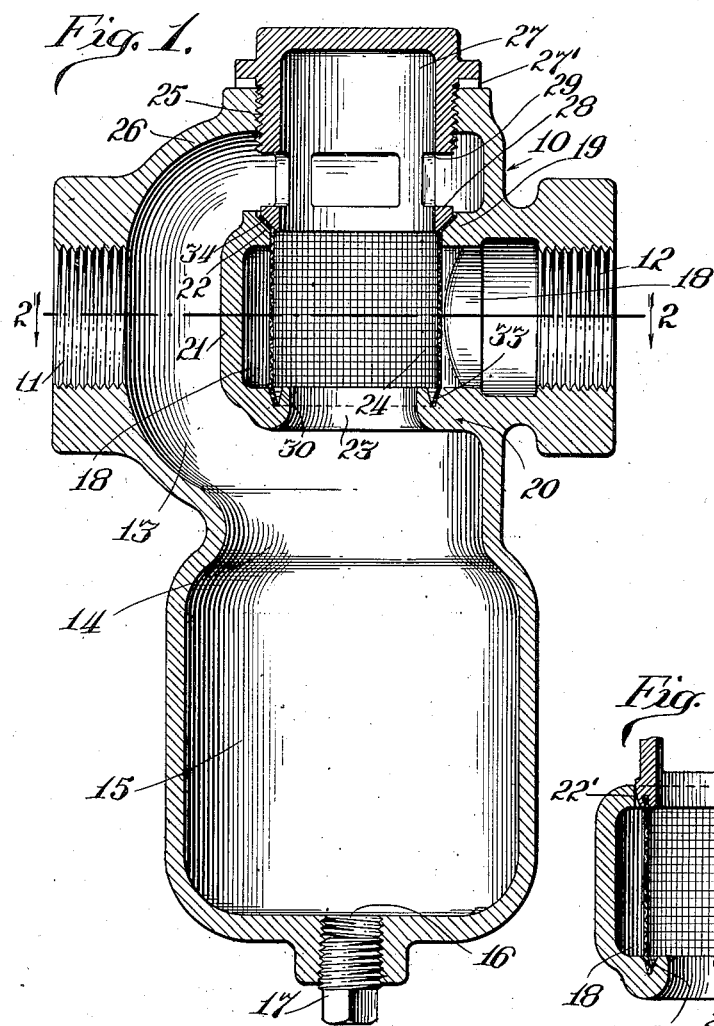
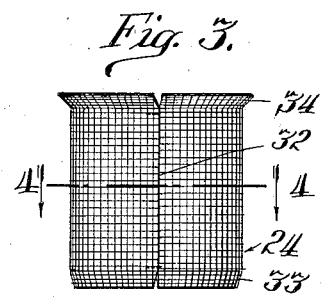
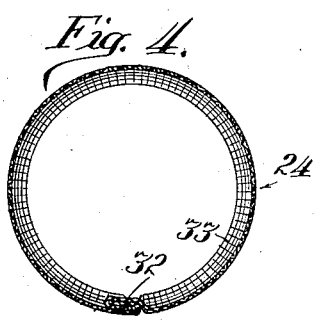
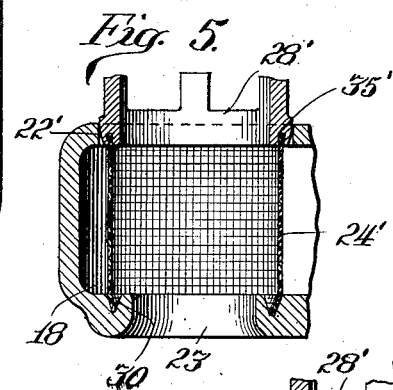
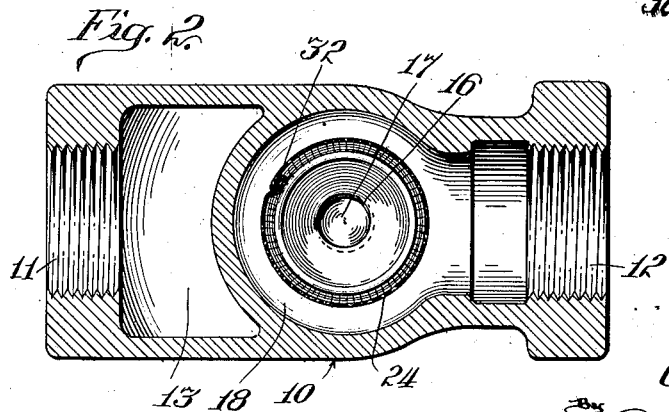
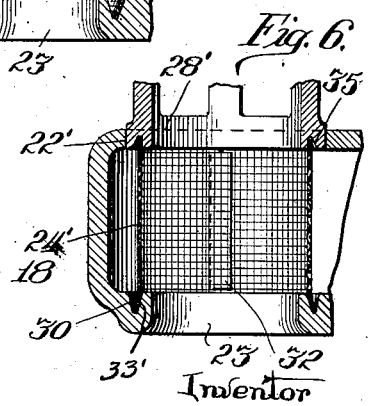
Inventor
Charles J. DeCoster
Attorneys Patented Feb. 12, 1924.

1,483,285

UNITED STATES PATENT OFFICE.

CHARLES J. DE COSTER, OF DECATUR, ILLINOIS, ASSIGNOR TO A. W. CASH COMPANY, OF DECATUR, ILLINOIS, A CORPORATION OF DELAWARE.

LIQUID STRAINER.

Application filed May 25, 1921. Serial No. 472,321.

*To all whom it may concern:*

Be it known that I, CHARLES J. DE COSTER, a citizen of the United States, residing at Decatur, in the county of Macon and State of Illinois, have invented certain new and useful Improvements in Liquid Strainers, of which the following is a specification.

My invention relates to liquid-strainers and, in some of its features, more particularly to strainers of the type intended for incorporation in a pipe-line to extract sand, grit and solid substances in general from the flowing liquid and cause the accumulation thereof in a sediment chamber.

The general objects of my invention are to provide a simple, efficient and economical construction particularly assuring the constant maintenance of the screening element in position effectively to screen all of the liquid flowing through the strainer device; to provide a simple and effective construction of screen, and to arrange for the ready removability of the screen but with security in the retention of the screen while the device is functioning.

To these and other ends, which will become apparent from the following specification, my invention consists in the features of construction, combinations and arrangements of parts hereinafter set forth and claimed.

In the drawings Fig. 1 is a central vertical section through a strainer device; Fig. 2 is a section on line 2—2 of Fig. 1; Fig. 3 is a detail view of the strainer detached; Fig. 4 is a detail section through the strainer on line 4—4 of Fig. 3; Fig. 5 is a fragment illustrating a modified arrangement of screen, and Fig. 6 is a similar view showing another modified arrangement of screen.

The casting 10 that provides the shell of the fitting has near its top the aligning inlet and outlet ports 11 and 12 formed in the respective connection-stubs that are internally threaded for incorporation in the flow pipeline. The port 11 opens to the inlet chamber 13 that extends both above and below the port level and at its bottom opens through a large throat 14 to a suitable vertically disposed sediment chamber 15 in the bottom portion of which there is a clean-out opening 16 normally closed by a plug 17.

The outlet port 12 communicates with an outlet chamber 18 the top, bottom and end walls, respectively numbered 19, 20 and 21, whereof may be cast integrally with the shell so that the outlet chamber in a sense projects into the inlet chamber 13 with ample clearance to leave a substantial waterflow space of the inlet chamber above, below and across the end of the outlet chamber.

In the top and bottom walls of the outlet chamber are vertically aligning openings 22 and 23 with which there coacts a cylindrical screen 24, preferably of wire mesh, arranged to permit communication between the inlet and outlet chambers, via the said openings 22 and 23, only through the screen mesh 24. This screen structure vertically registers with and is removable through an opening 25 in the top wall 26 of the shell, such opening being normally closed by a screw-plug 27 that has a skirt 28 provided with openings 29 in the plane of the water-flow channel above the outlet chamber, the bottom of this skirt extending down to cooperate with the top wall 19 of the outlet chamber.

In the form shown in Fig. 1 the bottom wall 20 of the outlet chamber has a V-shaped annular groove 30 concentric with and close to the orifice 23 and made in the upper surface of the wall, this groove practically aligning vertically with the smallest diameter of aperture 22 in the top wall. Such aperture 22 is beveled as shown, flaring toward its upper lip, and the bottom of the skirt 28 is made with a corresponding bevel so that when screw plug 27 is turned home, to bring its packing 27' into tight contact with the top of the fitting, the beveled edge of the skirt coacts with the beveled lip of the opening 22 to retain the screen 24.

The screen is preferably made with a lockseam vertical joint as at 32 throughout the major portion of its height, that is to say between those planes that will coincide with the top of the lower wall 20 of the outlet chamber and the bottom of the flaring lip of the upper wall. Above and below these planes the excess material necessary to make the lock-seam is cut away, leaving the upper and lower margins of the screen free to be shaped to take a lower bevel as at 33 (Fig. 3) or 33' (Fig. 6) conforming to the bevel of the V-shaped notch 30, and also to take an outward flare 34 conforming to the flaring lip of the upper opening 22. When a screen so constructed is inserted through the plug-opening in the top of the shell it takes approximate position as indicated in Fig. 1, and, when plug 27 is inserted and screwed home, the screen is firmly seated and tightly positioned in close-fitting contact with the receptive portions of the outlet chamber walls, obviating possibility of material finding its way through the water-flow channel without passing through the screen.

As illustrated in Fig. 6, the opening 22' in the top wall of the outlet chamber may be made straight-edged and the upper, straight-cut edge of screen 24' may be made to engage in a groove 35 formed in the lower margin of the skirt 28'. Again, as shown in Fig. 5, a similarly constructed screen may be permanently engaged in such a groove, 35', by spinning in the margin of the groove. In either such instance the lower portion of the skirt may make smooth-fitting contact with the square cut wall of the opening 22' of the top wall of the outlet chamber. Other changes in detail may be made, and I do not intend, by suggestion of these specific modifications, to limit my invention to the specific devices therein shown.

I claim:

1. A strainer fitting having an inlet chamber, an outlet chamber extending into the inlet chamber and communicating therewith only through aligning openings in the top and bottom walls of the outlet chamber, said walls of the outlet chamber being spaced from the top and bottom walls of the inlet chamber, and the top wall of the inlet chamber having an opening of a size to permit the passage of a screen, a screen-cylinder extending between the top and bottom walls of the outlet chamber, and a plug for said inlet-chamber top-wall opening having a depending open bottomed skirt provided with apertures in the plane of the water flow space above the outlet chamber and arranged to coact, at its bottom edge, with the screen and the opening through the top wall of the outlet chamber, to hold said screen fixedly in position.

2. A strainer fitting comprising a shell having an inlet chamber, an outlet chamber communicating therewith only through aligning openings in the top and bottom walls of the outlet chamber, said walls of the outlet chamber being spaced from the top and bottom walls of the inlet chamber, a removable plug in the top wall of the inlet chamber aligning with said openings in the outlet chamber walls and of diameter greater than the screen; and a cylindrical screen structure adapted for insertion and removal through said opening, coacting with the lower wall of the outlet chamber and extending to the plane of the upper-wall; said top plug having a skirt extending to the upper wall of the outlet chamber and provided with a beveled lower end to enter the cylindrical screen, and having lateral openings in the plane of the water-flow space between the top of the outlet chamber and the top of the shell, and the opening through the top wall of the outlet chamber having a flaring lip between which, and the beveled end of the skirt the screen may be clamped.

3. In a strainer of the character described, a shell provided with an inlet chamber and an outlet chamber, the latter defined by top, bottom and end walls spaced apart from the top, bottom and inlet-side of the inlet chamber, there being vertically aligning openings through the top and bottom walls of the outlet chamber, the opening through the top wall being larger than the opening through the bottom wall, and said bottom wall opening being surrounded by a groove; a cylindrical screen bearing in said groove and extending to the opening in the top wall of the outlet chamber, there being an opening in the top of the shell large enough to pass the screen, and a closure plug for said opening having a skirt, apertured in the plane of water-flow above the outlet chamber, and having its lower end arranged to coact with the screen and the wall of the opening through the top of the outlet chamber, to effect the closure against the passage of water between the screen and the opening through the top wall of the outlet chamber.

4. In a strainer of the character described, a shell provided with an inlet chamber, an outlet chamber having top and bottom walls spaced from the corresponding walls of the inlet chamber and provided with aligning openings, a screen to coact with said top and bottom walls of the outlet chamber, comprising a cylinder of wire mesh having a joint extending the major portion of its height and leaving the marginal portions of the screen free to take shapes conformable with the coacting portions of the fitting, there being provided in the top wall of the shell an opening large enough for passage of the screen aligning with its operative position, and means carried by a closure for said opening coacting with the screen to shape its free top portion into coacting engagement with the wall of the top opening of the outlet chamber.

5. A strainer fitting, a shell providing an outlet chamber having top and bottom walls, there being aligned apertures in said walls, one of said walls having a screen-receptive surface disposed at an oblique angle to the axis of said openings, a screen formed as a cylinder with a lock joint extending vertically of the major portion of the screen leaving a free end portion to be shaped to coact with said angular receptive portion of said outlet chamber wall, and means for positively positioning said screen.

6. As an article of manufacture, a screen for strainers of the character described, comprising a foraminous cylindrical body having a lock-seam throughout a major portion of its height, and top and bottom marginal portions non-connected at their adjoining seam-edges.

CHARLES J. DE COSTER.